United States Patent [19]

Gutman

[11] Patent Number: 5,481,910
[45] Date of Patent: Jan. 9, 1996

[54] ADJUSTABLE SPINDLE

[75] Inventor: Yevsey Gutman, Minneapolis, Minn.

[73] Assignee: GEI Systems, Inc., Minneapolis, Minn.

[21] Appl. No.: 100,114

[22] Filed: Jul. 30, 1993

[51] Int. Cl.⁶ ................................................. G01M 13/02
[52] U.S. Cl. .............................................................. 73/162
[58] Field of Search ................................................. 73/162

[56] References Cited

U.S. PATENT DOCUMENTS

| | | | |
|---|---|---|---|
| 3,796,092 | 3/1974 | Klinger et al. | 73/162 X |
| 4,024,757 | 5/1977 | Raess et al. | 73/162 |
| 5,207,097 | 5/1993 | Gutman | 73/162 |
| 5,219,389 | 6/1993 | Gutman | 73/162 |
| 5,224,377 | 7/1993 | Gutman | 73/162 |
| 5,307,676 | 5/1994 | Gutman | 73/162 |

Primary Examiner—William A. Cuchlinski, Jr.
Assistant Examiner—Willie Morris Worth
Attorney, Agent, or Firm—Westman, Champlin & Kelly

[57] ABSTRACT

An adjustable spindle includes an inner housing displaceable within an outer housing along a longitudinal axis thereof. The inner housing and outer housing define a chamber therebetween. A pump selectively pressurizes the chamber to displace the inner housing, while a clamping device centers and retains the inner housing on the longitudinal axis. An electric rotating machine is mounted inside and displaces with the inner housing.

14 Claims, 3 Drawing Sheets

ADJUSTABLE SPINDLE

BACKGROUND OF THE INVENTION

The present invention relates to spindles used for rotating a part. More particularly, the present invention provides a compact adjustable spindle allowing accurate positioning of the rotating part at selected positions on the axis of rotation.

Spindles are used commonly in electric machines to provide support for a rotating part. For example, in gear testing systems, a separate spindle is positioned on a stable support frame for rotating two gears that mesh together. In these gear testing systems, there is a desire to adjust the position of the gears relative to each other in order to ascertain the best position for running the gears. A common approach to changing the gear position is to relocate the spindle housing relative to the support base. However, the disadvantages of this method include the need for additional hardware located between the support housing and the base. In addition, it is also desired to move the gear in two distinct operations. For example, when the gear is to be replaced, a large movement is desired in order to allow easy access to the gear. However, when the relative position of the gears being changed in order to ascertain the best operating position, the movement of the gear is slight but high accuracy is required.

SUMMARY OF THE INVENTION

An adjustable spindle that allows large movements with easy access to the gear as well as slight, highly accurate movements, includes an outer housing having an opening defined by an inner surface, and an inner housing displaceable within the opening along a longitudinal axis thereof. The inner housing includes an electric rotating machine. The inner housing and inner surface of the opening define a chamber therebetween. A clamping device centers and retains the inner housing on the longitudinal axis. A pump selectively pressurizes the chamber to displace the inner housing resulting in selective positioning of the inner housing in relation to the outer housing.

In a preferred embodiment, the electric rotating machine includes a mounting mechanism for rotating an external body where the mounting mechanism includes a support plate for supporting the external body, a draw bar connected to the support plate and extending through a bore in a rotating shaft connected to the electric rotating machine, and a spring concentrically positioned about the draw bar for applying a force along the axis of rotation to secure the external body to the support plate. The mounting mechanism allows for the releasing of the applied force so that removal of the external body from the plate can occur. A displaceable piston with an aperture, that the draw bar extends through, is used for further compressing the spring after removal of the external body.

A support structure and a blocking mechanism are also provided in the preferred embodiment. The support structure guides the inner housing relative to the outer housing during displacement of the inner housing. The support structure includes two support rods mounted to the outer housing and an extending flange joined to the inner housing having apertures through which the support rods extends. Upon pressurization of the chamber, the inner housing moves relative to the outer housing until motion is stopped such as through contact between the extending flange and an end of the outer housing. Preferably, spacers are positioned partially around each of the support rods between the extending flange of the inner housing and the end of the outer housing to limit travel of the inner housing.

A blocking mechanism also limits travel of the inner housing. In the embodiment illustrated, the blocking mechanism includes two extending arms forming a hinge which is pinned to the outer housing. At remote ends of each of the arms, U-shaped apertures are provided so that each of the ends can be selectively positioned about one of the support rods to fill any excess space between the extending flange of the inner housing and the end of the outer housing.

Although the present invention will be described with respect to a hypoid or spiral beveli gear tester, principals forming the present invention are equally suited for testing other types of gears. Therefore, it is to be understood that the present invention is not limited to nor intended to be limited to a gear tester for hypoid or spiral bevel gears.

DETAILED DESCRIPTION OF THE PREFERRED EMBODIMENTS

Figure 1:
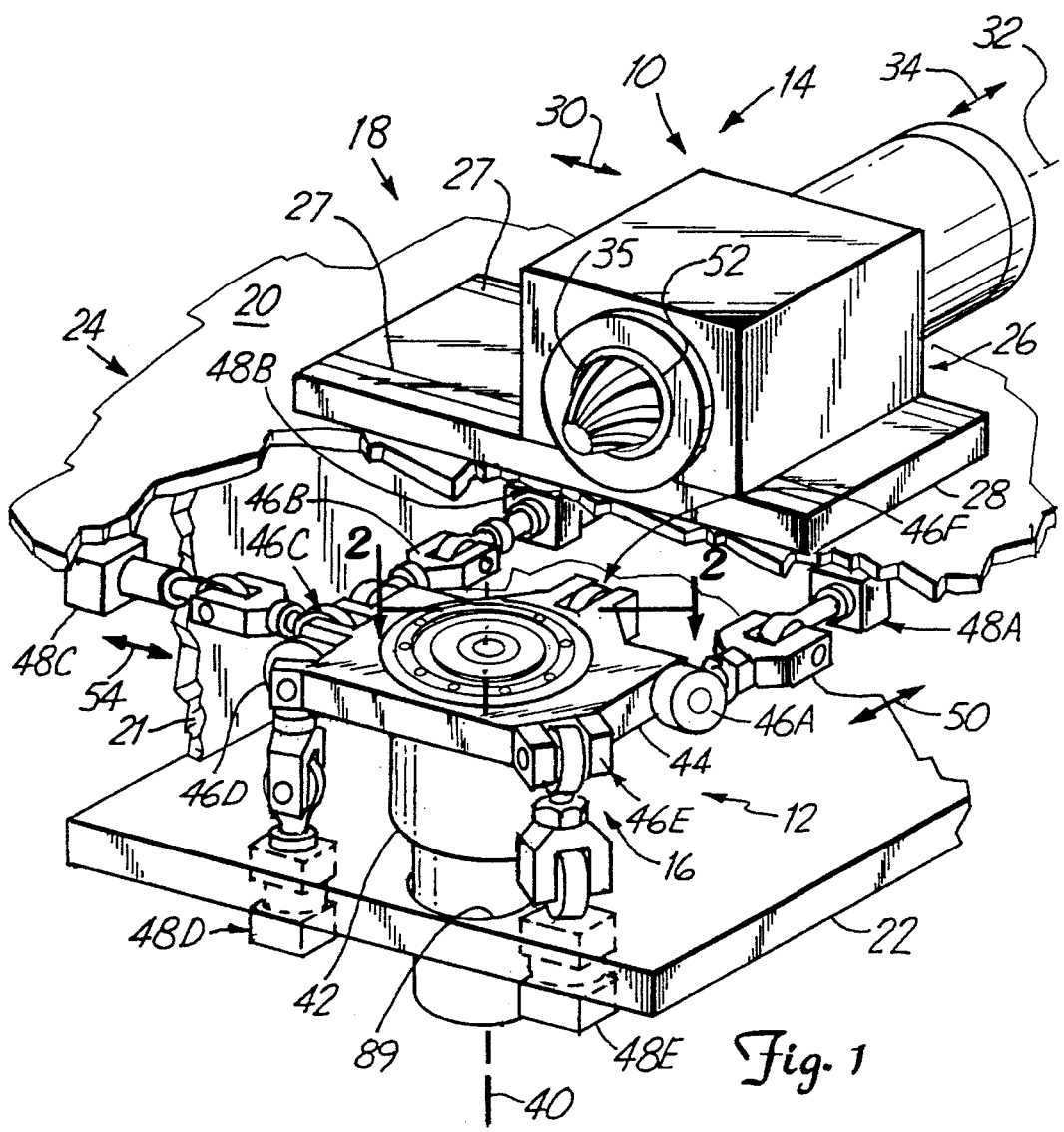
FIG. 1 is a perspective view of an adjustable spindle of the present invention included as part of a gear testing system with parts broken away and parts removed.

FIG. 1 illustrates two separate mounting arrangements 10 and 12 for adjustable spindles 14 and 16, respectively, of the present invention. As described herein, the adjustable spindles 14 and 16 are included as part of a gear testing! system generally shown at 18. The gear tester system 18 includes a support frame or table 20 mounted on suitable walls 21, which in turn are mounted on a base 22. The base 22, walls 21 and table 20 form a stable support structure 24. The structure 24 supports a first housing 26, as illustrated a pinion housing, for movement along tracks 27 in a housing base 28 linearly in a direction indicated by arrow 30, which is the hypoid offset. The adjustable spindle 14 is mounted within the pinion housing 26 and moves, as will be described below, along its longitudinal axis 32 in a direction indicated by arrow 34.

Figure 2:
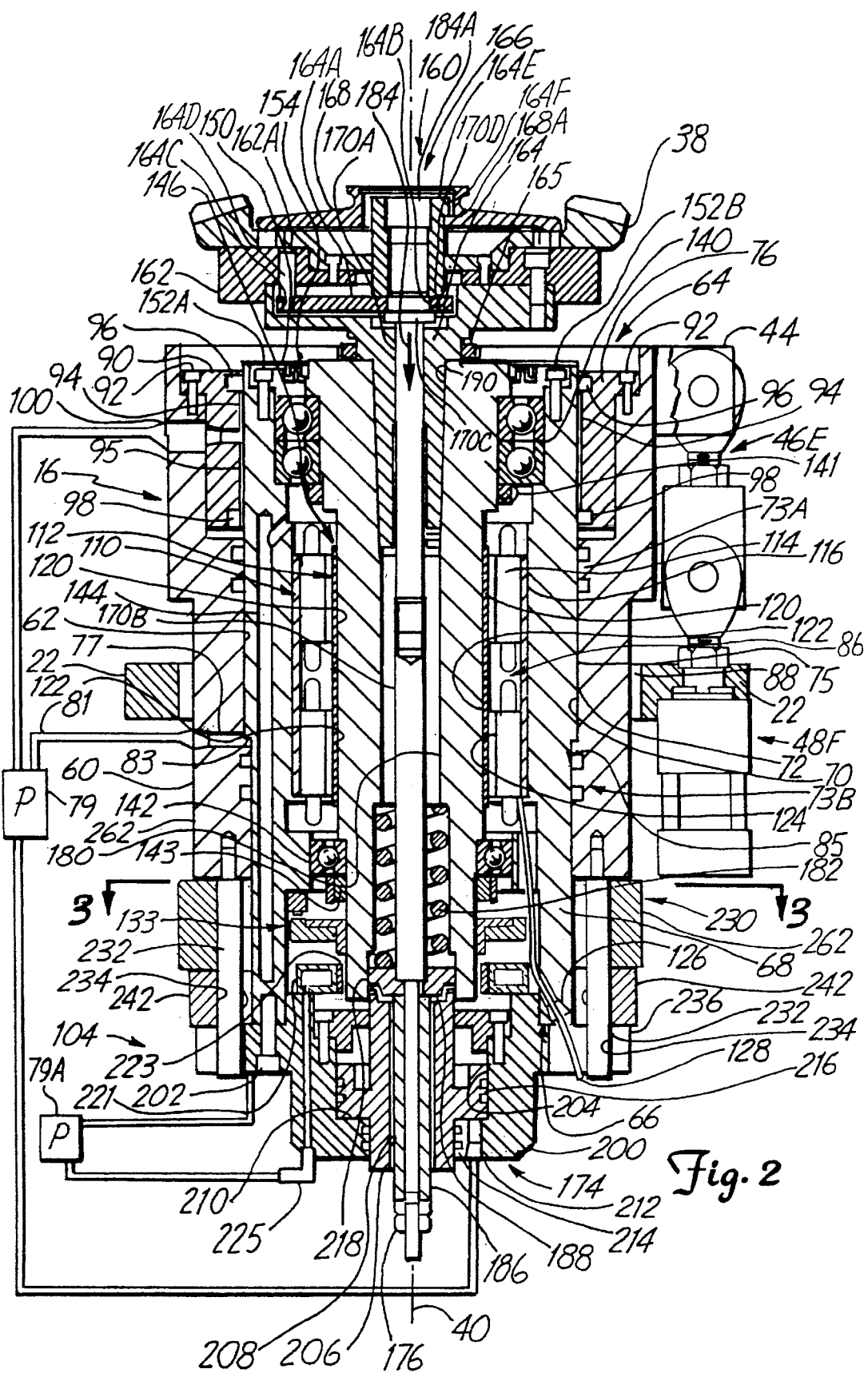
FIG. 2 is a sectional view taken along line 2—2 in FIG. 1.

The gear tester system 18 tests a pair of gears, as exemplified herein a pinion 35 and a gear member 38, illustrated in FIG. 2. In FIG. 1, the gear member 38 has been removed to enhance clarity. The pinion 35 is mounted on an end of the adjustable spindle 14 for rotation about the longitudinal axis 32. The pinion 35 drives the gear member 38 (FIG. 2) mounted on an end of the adjustable spindle 16 about a longitudinal axis 40. The adjustable spindle 16 is mounted in a gear housing 42. The gear housing 42 includes a flange 44. A plurality of rod ends 46A, 46B, 46C, 46D, 46E and 46F are mounted to the flange 44. Actuators 48A, 48B and 48C are joined at opposite ends of rod ends 46A–46C, respectively, and are mounted to a lower surface of the table 20, while actuators 48D, 48E and 48F (FIG. 2) are joined to opposite ends of rod ends 46D–46F, respectively, and are mounted in the base 22. Suitable sensors mounted within the actuators 48A–48F measure displacement of each actuator.

The actuators 48A–48F and rod ends 46A–46F support the gear housing 42 so that the gear member 38 (FIG. 2) can be selectively displaced with six degrees of freedom. The gear tester 18 permits computerized control of the actuators 48A–48F in response to input positioning control signals, and changing the control signals while the pinion 35 is being powered by the adjustable spindle 14 to rotate the gear member 38. The actuators 48A–48F are controlled in a conventional manner to adjust the gear mounting distance, which is the distance of the gear member 38 relative to the base 22, and the shaft angle, which is an included angle between the axis 40 about which the gear member 38 rotates and a reference axis perpendicular to the base 22. In addition, the actuators 48A and 48B move the gear housing 42 and thus the gear member 38 in a direction indicated by arrow 50, which is the distance of the axis 40 from a reference plane 52 on the pinion housing 26, typically referred to as the "H" position. Similarly, the actuator 46C moves the gear housing 42 and gear member 38 in a direction indicated by arrow 54, which is the offset of the axis (pinion axis) 32 relative to the axis (gear axis) 40, typically referred to as the "V" position or hypoid offset. Preferably, since the system 18 has six degrees of freedom and since the actuators are cross-coupled such that operation of one of the actuators will require operation of at least one other actuator to move the gear housing 42, computer control of the actuators is desired to obtain precision movement. As explained in further detail in my U.S. Pat. No. 5,307,676 entitled CONTROLLABLE GEAR TESTING SYSTEM issued May 3, 1994 and which is hereby incorporated by reference, the actuators control the relative position of the gear housing 42 and thus gear member 38 to the pinion 35 while both are rotating in order to determine the effect of various gear and pinion positions. In the referenced application, the actuators perform dual purposes in that they move in fine adjustments so that various gear/pinion positions can be tested. The actuators of the referenced application also displace the gear member over relatively large distances in order to allow disengagement of the gear member from the pinion so that the gear member and pinion can be removed from the gear tester. In contrast, the actuators of the present gear tester provide only fine displacements to test various gear/pinion positions. The adjustable spindles 14 and 16, described below, are displaceable along each of their respective longitudinal axes 32 and 40 to allow removal of the gear member and the pinion. In addition, the adjustable spindle of the present invention provides a self-contained electric rotating machine that can be operated as a drive motor, for example, in the pinion housing 26, or as a loading mechanism, for example, in the gear housing 42.

The adjustable spindle 16 is illustrated in detail in FIG. 2. Since the adjustable spindle 16 is essentially identical to that of the adjustable spindle 14, reference herein will be made only to the adjustable spindle 16 for description purposes although it is to be understood both are substantially similar.

The adjustable spindle 16 includes an outer housing 60 having an inner cavity 62 with openings 64 and 66 on either end. The outer housing 60 is centered on the longitudinal axis 40. An inner housing or cartridge 68 is displaceable linearly on the longitudinal axis 40 and cooperates with an inner surface 70 of the outer housing 60 to define a chamber 72, preferably cylindrical, therebetween. Seals 73A and 73B in the outer housing 60 engage an outer surface 75 of the inner housing 68 to seal the chamber. A pressure port 77 connected to a suitable pump, illustrated schematically at 79, through a pressure line 81 selectively pressurizes the chamber 72 to displace the inner housing 68 within the inner cavity 62 generally along the axis 40. A support flange 83 of the inner housing 68 contacts an extending complimentary flange 85 of the outer housing 60 to limit downward displacement of the inner housing 68 in the cavity 62.

A clamping device 76 centers and holds the inner housing 68 on the longitudinal axis 40 when a desired position of the inner housing has been obtained. An electric rotating machine 86 is mounted in the inner housing 68 and has a rotating shaft 88 upon which the gear member 38 is mounted on an end thereof. The electric rotating machine 86 moves with the inner housing 68 allowing the gear member 38 to be moved up or down to engage or disengage the gear member 38 with the pinion 35. Displacement of the inner housing 68 within the cavity 62 is sufficient to allow easy removal of the gear member 38 when desired. The outer housing 60 is fastened to the support flange 44, which as stated above, is used in cooperation with the actuators to support the gear housing 42 above the base 22. The outer housing 60 is positioned within a opening 89 having sufficient clearance to allow movement of the gear housing 42 upon operation of the actuators 48A–48F.

As stated, the clamping device 76 centers the inner housing 68 on the axis 40. As embodied herein, the clamping device 76 comprises a cylindrical pressurized locking mechanism manufactured, for example, by Hydralock Corporation of Warren, Mich. Generally, the clamping device 76 includes an outer cylindrical support member 90 that is fastened with a plurality of bolts 92 to the outer housing 60. An inner sleeve 94 located between ring seals 96 and 98 defines an inner cylindrical chamber 95 with an inner surface of the support member 90. A pressure port 100 provided through the outer housing 60 and the support member 90 is used to selectively pressurize the chamber 95. When pressurized, the inner sleeve 94 deflects inwardly toward the inner housing 68 so as to engage the outer surface 75. The inner sleeve 94 is a high precision element deflecting uniformly so as to center the inner housing 68 on the longitudinal axis 40. Although capable of providing sufficient clamping force to retain the inner housing 68 in a stationary position relative to the longitudinal axis 40, in order to minimize deformation of the inner housing 68, the clamping device 76 is generally operated to provide enough force to center the inner housing 68 on the axis 40, whereas upward movement of the inner housing 68 is limited by a spacer 104, described below.

As stated above, the inner housing 68 houses the electric rotating machine 86. Generally, the electric rotating machine 86 includes the rotating shaft 88 and suitable electrical components to construct either a motor or a loading mechanism. In the embodiment illustrated, the electric rotating machine 86 is a DC motor with a stationary outer stator 110 and a rotating inner rotor 112. The outer stator 110 includes windings wound around a slotted support cylinder 114. The slotted support cylinder 114 is mounted to an inner surface 116 of the inner housing 68. The rotor 112 comprises a plurality of magnets 120 mounted an outer surface of the rotating shaft 88 at periodic angular positions to provide a number of magnetic poles. If desired, a second set of magnets 122 and a second set of stator windings 124 can be positioned in a similar manner. An opening 126 allows leads 128 from the stator windings 110 and 124, if present, to exit the outer housing 60. These electric motors are available from a number of commercial vendors, including Motion Control System, Inc. of Dublin, Va. and CSM Inc. of New Ulm, Minn. It is to be understood that other electric machines such as induction or synchronous machines, or variations thereof, can be equally adapted to be mounted within the inner housing 68. A suitable optical encoder 133 such as manufactured by Heidenhain Corporation of Schaumburg Ill. is provided to verify rotor speed.

The rotor shaft 88 is supported at opposite ends on suitable bearing assemblies indicated generally at 140 and 142. The bearing assemblies 140 and 142 are secured in position with suitable nuts 141 and 143, respectively. Cooling passages 144 from the outer surface of the inner housing 68 to an inner cavity 146 allow heat from the electric machine 86 to escape. Circulation from a pump 79A connected to passages 144, but not shown, can then circulate air or the like through the cooling passages 144. If desired, the cooling passages 144 can be sealed from the inner cavity 146. A cover plate 150 is bolted to the inner housing 68 with a plurality of bolts, two of which are shown at 152A and 152B. A suitable seal 154 allows rotation of the rotor shaft 88 and seals an upper opening preventing dirt or debris from entering the inner cavity 146.

The adjustable spindle 16 includes a mounting device 160 to mount the gear member 38 on an end of the rotor shaft 88. The mounting device includes a ring gear support plate 162 supporting the gear member 38 on an arbor indicated at 164. The arbor 164 can be removed from the tapered bore 190 with a nut 165. A locking mechanism 166 comprising a pulling cup 168 and draw bars 170A and 170B that extend through the rotor 112 and a chucking device 174 secures the gear member 38 to the gear support plate 162 with a nut 176 located on an end of the draw bar 170B. The arbor 164, locking mechanism 166 and pulling cup 168 are of conventional design used in the machine tool industry, for example in the gear industry by Gleason Works of Rochester, N.Y. The drawbar 170A has an enlarged end 170C and an extending annular flange 170D. A stop plate 164A is located within the arbor 164 and has a first aperture 164B that receives the enlarged end 170C and a second aperture 164C that is used to mount a pin 164D. The pin 164D slides within an aperture 162A formed in the gear support plate 162. A tubular support 164E has an extending flange 164F that engages an inner annular surface 168A of the pulling cup 168. A rod end 184A is secured to the enlarged end 170C to hold the tubular support 164E against the stop plate 164A, and the stop plate 164A against the extending annular flange 170D of the drawbar 170A. The rotor shaft 88 includes a central bore 180 located therein centered on the rotor shaft axis. A coil spring 182 positioned about the draw bar 170B is compressed when the nut 176 is turned to generally pull the draw bars 170A and 170B in a direction indicated by arrow 184. A spacer 186 and spring stop 188 are used to compress the spring 182. When compressed, the spring 182 provides a preload force which generally pulls the arbor 164 into a tapered bore 190 of the rotor shaft 88 and pulls the pulling cup 168 downwardly to hold the gear member 38 on the gear support plate 162. Movement of the drawbars 170A and 170B in a direction opposite to arrow 184 allows the pulling cup 168 to be removed from the tubular support 164E thereby allowing the gear member 38 to be removed. Upward movement of the drawbars 170A and 170B and elements connected thereto is limited by contact of the stop plate 164A with the gear support 162.

The chucking device 174 allows quick and easy removal of the gear member 38 from the gear support plate 162 while maintaining the selected load force on the gear member 38 when the new gear member is installed. The chucking device 174 includes an end cap 200 mounted to the end of the inner housing 68 by conventional means, such as a plurality of bolts, one of which is shown at 202. A cylindrical piston 206 having a center aperture 208 therethrough is positioned about the spacer 186 and defines a chamber 204 with a inner surface 210 of the end cap 200. A pressure port 212 provides access to the chamber 204 for selective pressurization from the pump 79. Seals 214 and 216 seal the chamber 204. The piston 206 engages the spring stop 188 with a conventional thrust bearing 218 located therebetween. When the chamber 204 is sufficiently pressurized to develop a force greater than the preload force found in the compressed spring 182, the piston 206 moves upwardly to further compress the spring 182 thereby releasing downward pulling tension of the draw bars 170A and 170B upon the locking mechanism 166. The locking mechanism 166 can then be released to allow removal of the gear member and installation of a new gear member. When the pressure in chamber 204 is released, downward pulling tension on the draw bars 170A and 170B is restored with the preload force stored in the spring 182.

A brake assembly 221 mounted to the end cap 200 selectively engages the rotor shaft with brake pads 223 to hold the shaft from rotating. In the embodiment illustrated, the brake assembly is manufactured by Eaton Corporation, Airflex Division, of Brookfield, Wis. The pump 79A selectively pressurizes the brake assembly 221 through a pressure port 225 in the end cap 200.

Figure 3:
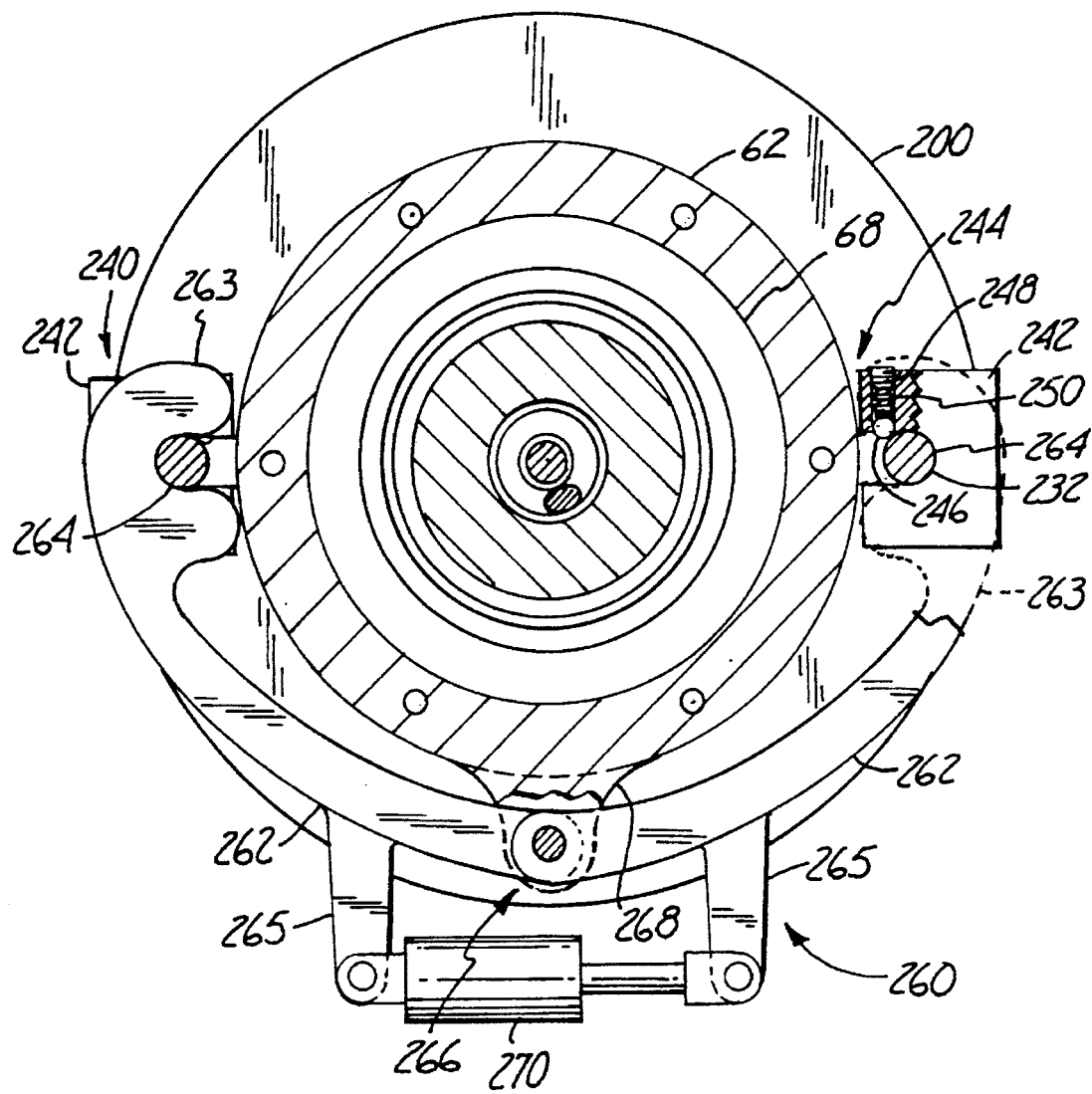
FIG. 3 is a sectional view taken along line 3—3 in FIG. 2.

Although the clamping device 76 described above can be sufficiently pressurized to engage the inner housing 68 and prevent rotation thereof when the gear member 38 is loaded, an additional support structure 230 is provided to absorb torque between the inner housing 68 and the outer housing 60. Referring also to FIG. 3, the support structure 230 includes support or guide rods 232 extending downwardly from the outer housing 60. Apertures 234 in an outwardly extending flange 236 of the end cap 200 receive the support rods 232. In addition to providing additional torque support between the inner housing 68 and the outer housing 60, the support rods 232 guide the chucking device 174 and thereby the inner housing 68 upwardly maintaining its position relative to the outer housing 60. When the chamber 72 is pressurized, the inner housing 68 displaces upwardly until contact is made between the spacing element 104 supported by the flange 236 and an end 242 of the outer housing 60. The spacing element 104 thereby limits upward displacement of the inner housing 68 and the gear member 38 so that preset repeatable positions of the gear member 38 relative to the pinion 35 can be made. By changing the thickness of the spacing element 104, upward movement of the inner housing 68 and the gear member 38 can be easily and accurately changed.

Preferably, the spacing element 104 includes two U-shaped spacers 242 wherein one of the spacers 242 partially surround each of the support rods 232. Each spacer 242 includes a locking mechanism 244 which reduces the aperture of the spacer preventing the support rod 232 from exiting thereout. As exemplified, the locking mechanism 244 comprises a retractable projecting ball 246 having a spring 248 located in a cavity 250 to force the projecting ball 246 outwardly into the aperture of the spacer. In operation, the spacer 242 can be removed easily with sufficient force to partially retract the ball 246 and compress the spring 250 so that the respective support rod 232 can exit the aperture of the spacer 242.

FIG. 3 further illustrates a retractable blocking mechanism 260 to prevent undesired upward movement of the inner housing 68 from its lower position. The blocking mechanism includes retractable arms 262 having a U-shaped aperture 264 on remote ends 263. The retractable arms 262 are pinned together at ends opposite the U-shaped apertures 264 to form a hinge 266 on an outwardly extending flange 268 of the outer housing 60. An actuator 270 connected to each of the arms 262 through levers 265 causes movement of the remote ends 263 so that the U-shaped apertures 264 partially surround each respective support rod 232. In operation, when the inner housing 68 is lowered to a position such as illustrated in FIG. 2, the actuator 270 extends to move the arms 262 to position the remote ends 263 in order to substantially fill the space between each spacer 242 and the outer housing 60. In this position, upward movement of the inner housing 68 is blocked. However, when upward movement is desired, the actuator 270 contracts to move the remote ends 263 away from the inner housing 68 and vacate the space between the spacers 242 and the outer housing 60.

In summary, the present invention provides an adjustable spindle for positioning a rotating part at selected positions along the axis of rotation. The adjustable spindle provides an accurate stable support for the rotating part, while movement along the axis of rotation allows easy replacement. In operation, the adjustable spindle can easily be operated to provide a drive motor, or alternatively, as a braking load.

Although the present invention has been described with reference to preferred embodiments, workers skilled in the art will recognize that changes may be made in form and detail without departing from the spirit and scope of the invention.

What is claimed is:

1. An adjustable spindle comprising:
   an outer stationary housing having a cavity with a longitudinal axis and an opening extending along the longitudinal axis from the cavity to an outer surface;
   an inner housing positioned in the cavity and cooperating with an inner surface of the outer stationary housing to define a chamber;
   a pump operably coupled to the chamber for pressurizing the chamber and replacing the inner housing relative to the outer stationary housing parallel to the longitudinal axis;
   a clamping device located between the outer stationary housing and the inner housing for selectively fixing the position of the inner housing relative to the outer stationary housing; and
   an electric rotating machine secured in the inner housing for displacement therewith, the electric rotating machine having a rotating shaft.

2. The adjustable spindle of claim 1 wherein the opening is circular defining a cylindrical cavity in the outer stationary housing; and wherein the inner housing has an outer cylindrical surface; and wherein the clamping device is cylindrical having an inner surface selectively engaging the outer surface of the inner housing.

3. The adjustable spindle of claim 2 wherein the clamping device includes a second chamber, the inner surface of the clamping device engaging the outer surface of the inner housing when the second chamber is pressurized.

4. The adjustable spindle of claim 1 and further comprising a holding device fixed relative to the inner housing and releasably contacting the rotating shaft.

5. The adjustable spindle of claim 4 wherein the holding device comprises a brake assembly.

6. The adjustable spindle of claim 5 wherein the clamping device centers the inner housing on the longitudinal axis of the outer housing, and the adjustable spindle further includes a stop member joined to the inner housing to limit displacement of the inner housing along the longitudinal axis.

7. The adjustable spindle of claim 6 wherein the stop member comprises an extending flange with a guide aperture and the adjustable spindle further comprises a support rod joined to the outer housing, the support rod extending through the guide aperture.

8. The adjustable spindle of claim 7 wherein the stop member includes a second guide aperture and the adjustable spindle comprises a second support rod joined to the outer housing, the second support rod extending through the second guide aperture.

9. The adjustable spindle of claim 6 and further comprising a spacing element located between the stop member and the outer housing to selectively limit displacement of the inner housing relative to the outer stationary housing.

10. The adjustable spindle of claim 7 and further comprising a spacing element located between the extending flange and the outer housing and at least partially surrounding the support rod, the the spacing element selectively limiting displacement of the inner housing relative to the outer stationary housing.

11. The adjustable spindle of claim 6 and further comprising an arm with an end selectively positionable between the stop member and the outer housing.

12. The adjustable spindle of claim 11 and further comprising a second retractable arm selectively positionable between the stop member and the outer housing, the first-mentioned arm and the second arm being pivotally secured to the outer housing.

13. The adjustable spindle of claim 12 and further comprising an actuator for selectively retracting the arms.

14. The adjustable spindle of claim 1 wherein the electric rotating machine comprises a DC motor.

* * * * *